Patented Feb. 14, 1939

2,147,242

UNITED STATES PATENT OFFICE 2,147,242

PLASTIC COMPOSITIONS

Courtney Conover, St. Louis, Mo., assignor to Monsanto Chemical Company, St. Louis, Mo., a corporation of Delaware No Drawing. Application April 27, 1935, Serial No. 18,536. In Great Britain April 10, 1935

19 Claims. (Cl. 106—22)

The present invention relates to compounds suitable for use as plasticizers and modifiers of artificial and natural resin-like materials.

The application is a continuation in part of co-pending application Serial Number 643,534, filed November 19, 1932, which issued as Patent No. 1,999,181.

The main objects of the invention are to provide:

A class of plasticizers of the above described compositions which are relatively inexpensive to prepare; which are of unusually high boiling points and exhibit an exceptionally high degree of permanency in plastic compositions; which are non-odorous; which are readily compatible with nitrocellulose and such like materials, and are relatively light stable therein; which are plasticizers of nitrocellulose and other plastics at relatively low temperatures; and to novel methods of preparing the above described compositions.

As is well known, most of the common plastic materials, such as cellulose esters, and such natural and artificial resins as shellac, alkyd resins, phenol-formaldehyde resins, styrol resins and vinyl resins, prepared by condensing such vinyl compounds as vinyl acetate, vinyl chloride, mixtures thereof or modified vinyl resins obtained by further condensing the above described vinyl products with an aldehyde, such as formaldehyde, acetaldehyde or furfuraldehyde, tend upon exposure to become hard and brittle. As a result, articles molded therefrom or films formed from solutions thereof, within a relatively short period of time tend to crack and check. In order to reduce this tendency, it is customary to incorporate into the materials certain modifiers termed plasticizers which have the property of increasing the elasticity and flexibility of the compositions without rendering the latter unduly soft.

Although many compounds have been suggested as acting as softeners for these compositions, but relatively few of them are of commercial value and even of those which are employed in commercial practice still fewer are free from various objectionable features. Some of them are of too low a degree of compatibility with the resins which are to be plasticized to admit of their use in adequate quantities. Others, even though they are relatively compatible with the resins, are so volatile in their nature that they soon evaporate and leave the materials containing them unplasticized. Some, while they function satisfactorily at normal temperatures, upon exposure to relatively low temperatures become hard and brittle and as a result they are unsuitable for use where they are exposed to excessive cold. Another common defect encountered consists in the tendency of the materials to become discolored upon exposure to light and air.

The present invention involves the discovery that the non-resiniferous esters of 2,2′ or 2,4′ benzophenone dicarboxylic acid constitute valuable plasticizers and modifiers of cellulose esters and artificial and natural resins.

The neutral esters of benzophenone 2,2′ dicarboxylic acid are especially important members of this class. These may be represented by the formula:

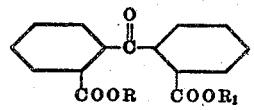

where R and R₁ are residues selected from a relatively large class including methyl, ethyl, propyl, iso-propyl, butyl and similar alkyl hydrocarbon groups. One or both may also include residues of cyclohexanol, monohydroxyl, mono alkyl substituted glycols, and hydroxy esters, such as methyl, ethyl, and butyl esters of glycollic acid and other compounds of similar nature where a hydroxy compound is replaced by the carboxy group of the acid.

The above described esters, it will be observed, consist of the simple monomeric products. Complex resinous polymeric products obtained by prolonged heating of the keto dicarboxylic acid in the presence of a polyhydroxy alcohol are not contemplated, and are not suited for the purposes of the present invention.

Compounds suitable for the purpose are obtained by esterification of benzophenone 2,2′ dicarboxylic acid. The preparation of the lactone of this acid by decarboxylation of phthalic anhydride under substantially anhydrous conditions is described in detail in the above noted application Serial Number 643,534 of November 19, 1932, which issued as Patent No. 1,999,181.

The esterification may be accomplished by various methods. One convenient method involves the treatment of the lactone of benzophenone 2,2′ dicarboxylic acid with an alkali (in slight excess), such as sodium hydroxide or calcium hydroxide. The sodium hydroxide is employed hot and preferably of a concentration ranging from 10 to 20 per cent, although it will be appreciated that somewhat higher or even lower values may be employed if desired. The sodium salt of the acid thus obtained is then neutralized with a slight excess of such mineral acid as dilute sulfuric or hydrochloric acid to liberate the organic acid in free state, while forming the inorganic salt. The free acid is filtered from the solution and while it is still fresh, it is admixed with the desired hydroxy compound (e. g. butyl alcohol) in an excess over that theoretically required to form the dibutyl ester of benzophenone 2,2′ dicarboxylic acid. The esterification is effected by refluxing this mixture in the presence of a small amount (e. g. 2%) of an acid, such as sulfuric acid or hydrochloric acid.

The refluxing should extend over a period of several hours (for instance, 5 hours) until esterification is complete and water of reaction is no longer formed. It is to be understood that during this period of refluxing the water of reaction is withdrawn from the system by well-known methods. It may be desirable to add small quantities of fresh alcohol from time to time in order to maintain the concentration thereof throughout the period of reaction. The cessation of the formation of water is one criterion of the completion of the reaction; however, other criteria may be employed if desired. One convenient test is a titration test of a sample of the reaction product to ascertain when substantial neutrality is reached.

Purification may be effected by evaporating excess alcohol and if desired the product may be decolorized by treatment with charcoal or by oxidation with permanganate of potash. These two treatments may be combined if so desired. These steps are, of course, conventional and need not be described in detail.

The butyl ester of benzophenone 2,2' dicarboxylic acid is a heavy, oily, non-odorous liquid, boiling at a temperature of 228° C., at a pressure of 1.8 mm. (absolute). This ester is compatible with nitrocellulose and such artificial resins as phenol-aldehyde resins, alkyd resins, styrol resins, polymerization products of vinyl chloride, vinyl acetate, or mixtures of these two, or modified resins obtained by further condensation of the vinyl polymerization products with such aldehydes as formaldehyde, acetaldehyde, or furfuraldehyde. With "vinylite", which is a mixed condensation product of 80% of vinyl chloride and 20% of vinyl acetate, the butyl ester is compatible and forms an exceedingly tough product.

It is also compatible with such natural resins as shellac and with the latter it forms, upon baking for a day or two at about one hundred degrees centigrade, a very tough, resistant mass.

A second convenient method of preparing these products involves the simple addition of an alcohol, such as methyl, ethyl or butyl alcohol to the lactone and then subjecting the mixture to vigorous refluxing. It will be appreciated that in this reaction several molar equivalents of the alcohol should be employed in order to provide a favorable equilibrium condition for the reaction. The reaction may be conducted at normal or elevated pressures as may be desired. A mineral acid such as sulfuric acid or hydrochloric acid may be added. The course of the reaction may be represented by the following equation:

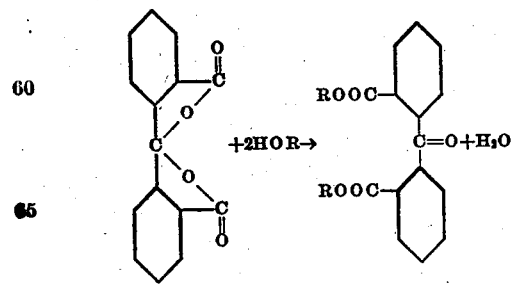

It is to be understood that the reaction is of general type and that the alcohol indicated by the type formula HOR may be any of the common aliphatic and cyclo-aliphatic alcohols, butyl alcohol merely being described above for the purpose of illustration. In case ethyl alcohol is employed, the diethyl ester obtained has a boiling point of 204° C. under a pressure of 3 millimeters (absolute). The melting point is 73–74° C. The dimethyl product has a melting point of 83° C.

Glycollic acid esters may be prepared by reacting the sodium salt of the mono ester of benzophenone 2,2' dicarboxylic acid with an ester of chloracetic acid. For example, the sodium methyl, ethyl, propyl, butyl and so forth esters, when refluxed in a suitable solvent, such as anhydrous alcohols, may be reacted with ethyl, methyl, propyl, iso-propyl, butyl or iso-butyl ester of chloracetic acid to form an ester of the general type formula:

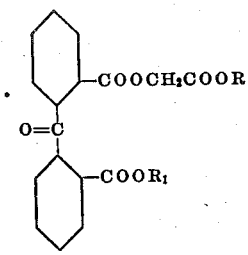

where R and $R_1$ are like or unlike radicals.

The sodium salt of the mono ester is conveniently prepared by reacting the lactone or the free acid with the desired alcohol in excess. The product is then treated with anhydrous sodium or potassium carbonate to neutralize the free acid group. Condensation is then effected with the ester of chloracetic acid.

The plasticizers which constitute the subject matter of this invention may be incorporated in the plastic in the usual manner. The following constitute specific examples of such applications of the invention.

*Example I.*—A nitrocellulose film may be made conveniently by forming a solution of cellulose nitrate in a solvent which may contain the following ratios of ingredients:

25% active solvent such as ethyl acetate, butyl acetate, etc.
20% alcohol such as denatured alcohol, butyl alcohol, etc.
55% hydrocarbon such as benzol, toluol, etc.

Thereafter there is added about 20 to 30 per cent by weight of a simple, primary ester of benzophenone 2,2' dicarboxylic acid and the volatile solvent removed. The dibutyl ester is a specific example of such material. However, the other esters, including the diamyl, dimethyl and diethyl esters, may also be employed. Likewise, neutral esters, such as methyl, ethyl and butyl benzophenone 2,2' dicarboxylic acid esters of esterified glycollic acid, may be employed.

*Example II.*—A phenol aldehyde condensation product in which condensation or polymerization is only partial is dissolved in alcohol preferably to produce a 50 per cent by weight solution. To this solution may be added a suitable quantity (e. g. 30 per cent by weight based upon resin content of any of the above described esters) of benzophenone 2,2' dicarboxylic acid. It will be appreciated that the proportion of plasticizer incorporated may be increased or decreased according to the degree of flexibility desired in the product.

The use of a solvent may be dispensed with in the foregoing example by incorporating the ester in the resin while the latter is in a fluxed or fluid condition.

*Example III.*—In similar manner a resin of the alkyd type prepared by condensing phthalic anhydride with glycerol containing a small amount of glycol to obtain a soluble thermo-plastic resin may be mixed while in a molten condition with 5 to 50 per cent of the plasticizers herein named. A uniform mixture is thus obtained which may be employed in the manufacture of varnishes, lacquers or molding compositions in a manner understood by those skilled in the art.

*Example IV.*—A polymerized styrol resin is dissolved in a suitable solvent such as acetone after which there is incorporated 10 to 20 per cent by weight of any of the esters herein described. The solvent is then eliminated in the usual manner.

*Example V.*—A vinyl ester resin such, for example, as polymerized vinyl acetate or polymerized vinyl chloride or a mixture of the two or their modified forms obtained by further condensation with such aldehydes as formaldehyde or acetaldehyde, is pulverized, after which from 2 to 20 per cent of any of the foregoing plasticizers is added as a spray to the powder. After standing for a few hours the plasticizer will have at least partially penetrated the resin and the product may be molded in any desirable form in the usual manner.

It will be appreciated that the plasticizer may also be added to the resin while the latter is in solution or molten form is so desired.

It is understood that the invention contemplates the use of the foregoing plasticizers, not merely as separate and distinct compounds but in admixture with each other in various proportions. The foregoing plasticizers may also be incorporated into the resins along with such other plasticizers as dibutyl phthalate, tricresyl phosphate, and such similar materials.

These improved plasticizers, as will be noted, are colorless, non-odorous and impart a degree of flexibility and permanency to the plastic compositions not shared by any of the known organic plasticizers.

The method of preparation of the compounds is not difficult and the primary materials are relatively inexpensive. For these reasons, these compounds are highly desirable for plasticizers from a commercial viewpoint.

Although only certain typical forms of the invention have been described, it will be appreciated that numerous modifications may be made therein without departure from the spirit of the invention or the scope of the appended claims.

Where the term "vinyl resins" appears in the claims it will be understood that styrol resins are included.

What I claim is:

1. A plastic material as defined in claim 6 in which the alcohol is an alkyl alcohol.

2. A plastic material as defined in claim 6 in which the alcohol is a butyl alcohol.

3. As a new composition of matter an organic material selected from the group consisting of cellulose esters, alkyd resins, phenolic-aldehyde resins, vinyl resins and shellac plasticized with and containing a neutral monohydric aliphatic alcohol ester of a benzophenone dicarboxylic acid.

4. As a new composition of matter an organic material selected from the group consisting of cellulose esters, alkyd resins, phenolic-aldehyde resins, vinyl resins and shellac plasticized with and containing a neutral monohydric alkyl alcohol ester of a benzophenone dicarboxylic acid.

5. As a new composition of matter an organic material selected from the group consisting of cellulose esters, alkyd resins, phenolic-aldehyde resins, vinyl resins and shellac plasticized with and containing a neutral butyl alcohol ester of a benzophenone dicarboxylic acid.

6. Organic plastic materials of the class consisting of cellulose esters, alkyd resins, phenolic-aldehyde resins, vinyl resins and shellac, admixed with a neutral monohydric aliphatic alcohol ester of benzophenone 2,2' dicarboxylic acid, said ester being a plasticizer for the materials.

7. Materials containing a plastic selected from a group consisting of cellulose esters, phenolic-aldehyde resins, alkyd resins, vinyl resins and shellac and a neutral aliphatic alcohol ester of benzophenone 2,2' dicarboxylic acid, said ester being a plasticizer for the materials.

8. The composition as defined in claim 7 and further characterized in that the benzophenone ester contains a glycollic acid ester group.

9. A plastic material as defined in claim 6 in which the alcohol is methyl alcohol.

10. A plastic material as defined in claim 6 in which the alcohol is ethyl alcohol.

11. An organic plastic composition comprising a cellulose ester admixed with a plasticizer for said cellulose ester consisting of a neutral monohydric aliphatic alcohol ester of a benzophenone dicarboxylic acid.

12. An organic plastic composition comprising cellulose nitrate admixed with a plasticizer for said cellulose nitrate consisting of a neutral monohydric aliphatic alcohol ester of a benzophenone dicarboxylic acid.

13. An organic plastic composition comprising a cellulose ester plasticized with and containing a neutral butyl alcohol ester of benzophenone 2,2' dicarboxylic acid.

14. Organic plastic materials of the class consisting of cellulose esters, alkyd resins, phenolic-aldehyde resins, vinyl resins and shellac admixed with the dibutyl ester of benzophenone 2,2' dicarboxylic acid, said ester being a plasticizer for the materials.

15. Organic plastic materials of the class consisting of cellulose esters, alkyd resins, phenolic-aldehyde resins, vinyl resins and shellac admixed with the dimethyl ester of benzophenone 2,2' dicarboxylic acid, said ester being a plasticizer for the materials.

16. Organic plastic materials of the class consisting of cellulose esters, alkyd resins, phenolic-aldehyde resins, vinyl resins and shellac admixed with the diethyl ester of benzophenone 2,2' dicarboxylic acid, said ester being a plasticizer for the materials.

17. An organic plastic composition comprising a cellulose ester plasticized with and containing the dibutyl ester of benzophenone 2,2' dicarboxylic acid.

18. An organic plastic composition comprising a cellulose ester plasticized with and containing the dimethyl ester of benzophenone, 2,2' dicarboxylic acid.

19. An organic plastic composition comprising a cellulose ester plasticized with and containing the diethyl ester of benzophenone 2,2' dicarboxylic acid.

COURTNEY CONOVER.

CERTIFICATE OF CORRECTION.

Patent No. 2,147,242. February 14, 1939.

COURTNEY CONOVER.

It is hereby certified that error appears in the printed specification of the above numbered patent requiring correction as follows: Page 3, second column, line 16, claim 7, after the word "neutral" insert monohydric; and that the said Letters Patent should be read with this correction therein that the same may conform to the record of the case in the Patent Office.

Signed and sealed this 11th day of April, A. D. 1939.

Henry Van Arsdale (Seal) Acting Commissioner of Patents.